Figures 1, 2:
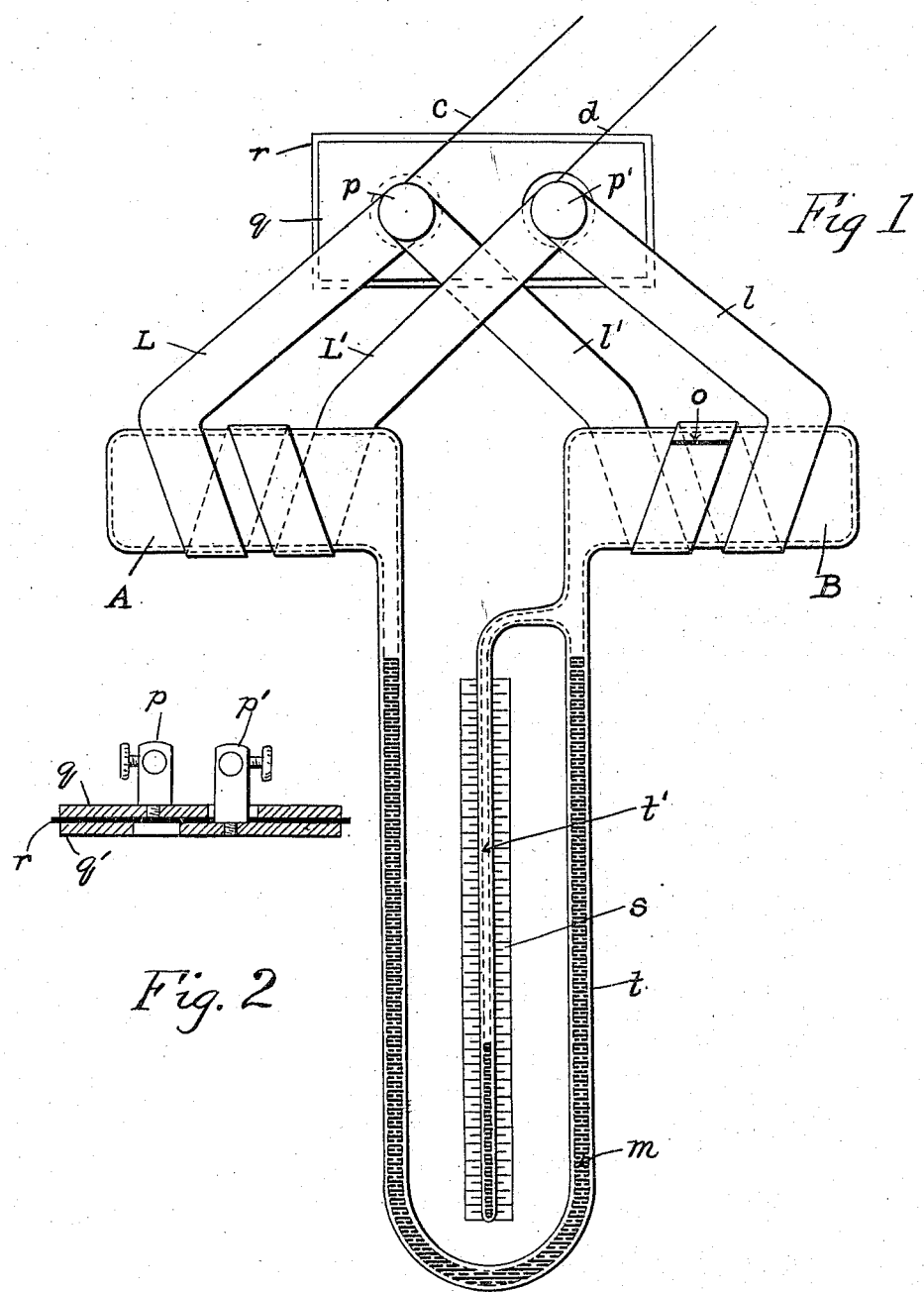

P. M. LINCOLN.
ELECTRIC INDICATOR.
APPLICATION FILED NOV. 12, 1914.

1,156,414.

Patented Oct. 12, 1915.

WITNESSES
J. Herbert Bradley.
Fred. Staub.

INVENTOR
Paul M. Lincoln
By F. W. H. Clay atty.

UNITED STATES PATENT OFFICE.

PAUL M. LINCOLN, OF PITTSBURGH, PENNSYLVANIA.

ELECTRIC INDICATOR.

1,156,414.  Specification of Letters Patent. Patented Oct. 12, 1915.

Application filed November 12, 1914. Serial No. 871,692.

*To all whom it may concern:*

Be it known that I, PAUL M. LINCOLN, a citizen of the United States, residing at Pittsburgh, in the State of Pennsylvania, have invented certain new and useful Improvements in Electric Indicators, of which the following is a specification.

My invention relates generally to electric indicating instruments operating by reason of the differential temperature of parts heated by a current to be measured and is herein shown as particularly applied to a differential temperature ammeter.

The primary object of the invention is to eliminate errors due to differences in rates of heat escape from different parts.

In the accompanying drawing Figure 1 is a diagram and side elevation of a type of ammeter already known, with my improvement applied thereto; Fig. 2 is a section of the binding post mounting.

Many electric measuring instruments, such as the well known Wright maximum demand meter, operate by employing the heat generated by the current to be measured to bring about a differential temperature between two bodies and thereby produce a physical motion which is employed for indicating. I have shown an improved form of such an instrument in my previous application No. 839051 filed May 16th, 1914, for an ammeter, in which expansible bars or tubes are employed and provision is made for compensating for changes of temperature other than those due to the current to be measured. In these meters the bar or tube may be heated by a winding carrying a current to be measured. In such constructions there inevitably occur errors in the indication, and particularly when the meter is of large ampere capacity. For example, I show in my drawing herewith a maximum indicating ammeter in which there are two vessels A and B containing air and connected by a small U tube $t$ containing a body of liquid $m$. Derived from the right branch of the tube $t$ is a branch tube $t'$, which by gaging the overflow from tube $t$ when the liquid is caused to rise in the right branch, indicates on the scale $s$, the maximum comparative expansion of the air in the bulb A over bulb B. This expansion is caused by the heat developed by the resistance winding L, L', in which the current to be measured flows from the leads $c$, $d$. The registration of such a meter thus depends upon the difference between the temperature of the air in bulb A and that in bulb B. I find however, that this relative temperature depends upon the relative rates by which these bulbs dissipate their heat. Heat escapes from any body by radiation, by conduction, and by convection. The temperature rises are however, so small that radiation plays a very small part and may be practically neglected. The loss by convection, depending upon the amount of surface exposed to the air, is practically equalized between the two bulbs if they have the same surface and form. The heat losses by conduction are totally different in all such instruments heretofore made. The bulb A with its metal wrapping L, L', binding post $p$, $p'$, and the leads thereof and the incoming leads $c$, $d$, all tend to carry away heat with comparative rapidity, whereas the bulb B as heretofore constructed has been without these heat dissipating devices. It is easy to show that this introduces serious error. Suppose the bulb A to have a hundred square cm. surface and a temperature rise at full load of say 40 degrees centigrade, the loss by convection per degree of temperature will be about .00025 gram calories per second on each square cm., and the total loss therefore about 1 gram calory per second. Supposing the instrument to be a hundred ampere meter, the leads L, L', may be of No. 3, B. & S. gage wire, each four inches long, and if the terminals at $c$, $d$, were at atmospheric temperature, these two leads would carry off approximately fifty per cent. more heat than the loss from the surface of bulb A by convection. Moreover, the temperature of the terminals would largely depend upon the status of the incoming leads $c$, $d$; if the meter were in a warm room and the leads passed through a wall into a winter temperature, we would have a condition very different from that when the meter is in a cool room and the leads passed out into hot summer temperature. Again if there were hot joints in any of the leads close to the winding L, L', this would produce another, and probably unknown, error. All of these errors and inaccuracies I overcome by making the conditions for dissipating heat exactly the same for the active bulb A and the passive bulb B. That is, I make the bulb B exactly like the bulb A, and duplicate thereon all the windings and leads as they are on the bulb A,— with the exception of course that current must not flow in the winding $l, l'$, which is provided against by breaking the winding $l, l'$, by insulation as at $o$, so that no current can flow. Thus the heat losses, whether due to conduction, or convection, or radiation, will be exactly alike for the two air chambers A, B; and the registration of the liquid in tube $t'$ will represent exactly the difference in the temperatures of the two chambers due to the current flowing in the winding L, L'.

The insulation $o$ must of course be so located that the heat dissipating ability of the winding on bulb B will be exactly the same as that on bulb A. So long as the terminals $p$ and $p'$ are at the same temperature, it is evident that the amount of heat that will flow from the bulb B to the terminals $p$ and $p'$, or vice versa, through the leads $l$ and $l'$ will be approximately equal in the two leads. From this, it is further evident that if the insulation $o$ be placed at the middle point of the winding on bulb B, such insulation—being a heat insulator as well as an electric insulation—will not interfere with the transfer of heat between bulb B and terminals $p$ and $p'$, so long as these two terminals are at the same temperature. If however, the two terminals $p$ and $p'$ are not at the same temperature, the heat that will flow over the leads $l$ and $l'$ will not be equal and the location of the heat insulation $o$ at the middle point of the winding on bulb B will cause a difference in the heat dissipating abilities of bulbs A and B. Since such a difference in temperatures between terminals $p$ and $p'$ might occur due to a hot joint in one of the leads $c$ or $d$, I provide for this contingency also by providing means for keeping the two terminals $p$ and $p'$ at practically the same temperature in spite of the heat that may be produced in one of them by a possible hot joint in its vicinity. Thus as better shown in Fig. 2, I attach to terminal post $p$ a metal plate $q$ of comparatively large area, and to terminal post $p'$, a similar metal plate $q'$. These metal plates are insulated from each other by the thin insulating plate $r$, which should be of as high a thermal conductivity as possible. This construction will permit heat to be transferred from terminal $p$ to $p'$, or vice versa, and still they will be electrically insulated from each other. The temperature of $p$ and $p'$ will therefore remain approximately the same and no appreciable error will be introduced by inserting the insulation $o$ at the middle point of the winding on the passive bulb B.

Having thus described my invention and its use, I claim:

1. An electric indicator operating by differential temperature changes between two chambers, comprising an active chamber, carrying a heating winding and an inactive chamber made of the same size and form provided with a dummy winding like the winding of the active chamber, except that as an electric circuit it is open.

2. An ammeter operating by comparative changes of temperature between two expansion elements, one of which is heated by the current to be measured, comprising an active element so heated, and an idle element of the same structure and the same heat dissipating capacity, substantially as described.

3. An ammeter comprising two air bulbs connected by a U tube containing a liquid, means to register the movements of the liquid upon differential expansion of the bulbs, a winding having proper leads and adapted for heating one of the bulbs, and an exact duplicate but open circuit winding with leads for the other bulb, substantially as described.

4. In an ammeter operating by relative differences of temperature between two heated elements, a device for equalizing the dissipation of heat comprising like structure on the two elements except that one structure conducts electricity and the other does not, electrical connectors for said structures, and means for equalizing the temperature between such connectors.

5. An ammeter comprising two bodies of identical heat absorbing and dissipating qualities, devices to measure differences of temperature between said bodies, means for heating one of said bodies by a current whose amperage is to be measured, said heating means being designed to affect equally both of said bodies, in respect of absorbing or dissipating heat other than that due to the current being measured.

In testimony whereof I have hereunto signed my name in the presence of the two subscribed witnesses.

PAUL M. LINCOLN.

Witnesses:
W. A. HECKMAN,
FRED'K STAUB.